United States Patent Office 3,350,335
Patented Oct. 31, 1967

3,350,335
NONDRYING ALKYD RESINS AND
PROCESS OF MAKING SAME
Raymond P. Silver, Kennett Square, Pa., assignor to
Hercules Incorporated, a corporation of Delaware
No Drawing. Filed Oct. 10, 1963, Ser. No. 315,384
9 Claims. (Cl. 260—22)

This invention relates to improved nondrying alkyd resins and a process for preparing these resins. More particularly, it relates to improved resins based on components comprising pentaerythritol, saturated fatty acids, a carbocyclic anhydride such as phthalic anhydride, an acyclic anhydride such as maleic anhydride, and an alkyl acrylate or methacrylate.

The copolymerization of vinyl monomers with alkyd resins has received wide attention in the art since the first styrenated alkyds became commercially available in 1948. Most investigations in this field of vinylated alkyds have been based on the use of styrene and acrylonitrile and in most instances, taking styrene as an example, the styrenated alkyds were mainly mixtures of alkyd resins modified with polystyrene homopolymers. Although the presence of polystyrene tends to improve hardness, drying characteristics, water resistance, and alkali resistance of the resin product, its presence also results in decreased exterior durability and lowered resistance of the resin product to oils, grease, and hydrocarbon solvents.

More recently, there has been some interest in the use of alkyl acrylates and alkyl methacrylates as modifiers for alkyd resins. It was found that the acrylated and methacrylated alkyds were improved with respect to initial color and color retention, drying speed, stain and chemical resistance, solvent and detergent resistance, gloss retention and exterior durability. However, the successful preparation of acrylated and methacrylated alkyds has been limited due to processing difficulties. Two main disadvantages have become apparent, namely, the very long cycle time required in preparation of the resin product, and the inability to obtain clear solutions and film with resin products prepared using nonconjugated drying oils such as soybean oil. The lack of conjugation apparently results mainly in homopolymer formation, rather than incorporation of monomer units into the resin molecule. The presence of considerable homopolymers in turn has an effect on clarity because of the comparative insolubility of the acrylate and methacrylate homopolymers in the usual alkyd resin solvents and the resins themselves. This is in contrast to the homopolymers of styrene. Moreover, since the acrylated and methacrylated alkyds of the prior art have been based on the use of unsaturated fatty acids, either conjugated or nonconjugated, the resulting products have been of the air-drying type and have been limited to uses where the ultimate in color stability and exterior durability were not required.

Thus, there has been a need for an acrylated or methacrylated alkyd which would exhibit superior color stability and exterior durability as measured by rate of chalking. There also has been a need for a resin material which, in the form of a finish, would be advantageous over other prior art finishes, such as the acrylic lacquers, in having improved pigment wetting and suspension, while at the same time having the good durability of the acrylics and the versatility of the alkyds.

In accordance with this invention, there has been discovered a comparatively small class of nondrying alkyd resins which may be used with one or more other components such as nitrocellulose and plasticizer in clear wood finishes, with these same components plus urea-based resins and catalysts for catalyzed wood finishes, or with melamine-based or urea-based resins for baking enamels. These alkyd resins are prepared by a novel and specific process, and the resins are best described in terms of the process for their preparation. The process requires four essential steps.

The first step in the process involves heating, at a temperature between about 190° C. and about 250° C., a polyhydride alcohol component in an amount corresponding to form from about 120 to about 150% of the hydroxyl equivalents theoretically required in the reaction of said component wtih both the mono- and di-carboxylic acids used in preparation of the alkyd resin, said polyhydric alcohol component being selected from the group consisting of pentaerythritol and mixtures of pentaerythritol with at least one compound selected from the group consisting of glycerol and ethylene glycol, the pentaerythritol in said mixtures contributing at least 50% of the total hydroxyl equivalents furnished to the reaction, with at least one fatty acid component selected from the group consisting of saturated fatty acids having 8 to 18 carbon atoms and triglycerides of fatty acids wherein at least 80% of the fatty acids are saturated fatty acids having 8 to 18 carbon atoms, the amount of said fatty acid component being sufficient to provide from about 20 to 50% of the total carboxyl equivalents needed for reaction with the 100% level of the hydroxyl equivalents furnished by the polyhydric alcohol components. In this step of the process, a fatty acid partial ester of the polyhydric alcohol component is formed. In the case of pentaerythritol, for example, the partial ester may be mono- to di-ester, and the partial ester accordingly contains from three to two unreacted hydroxyls.

After formation of the fatty acid partial ester of the polyhydric alcohol component, the next step comprises cooling the reaction mixture containing the partial ester to a temperature less than about 170° C. and then effecting reaction of said mixture at a temperature in the range from about 140° to about 170° C. with the combination of at least one carbocyclic dicarboxylic acid anhydride selected from the group consisting of phthalic anhydride, tetrahydrophthalic anhydride, hexahydrophthalic anhydride, tetrachlorophthalic anhydride and chlorendic anhydride, and at least one acyclic dicarboxylic acid anhydride selected from the group consisting of maleic anhydride, citraconic anhydride and itaconic anhydride, the mole ratio of said carbocyclic anhydride to said acyclic anhydride being in the range of about 6:1 to about 2:1, and the amount of said combination of anhydrides being sufficient to provide from about 50% to about 80% of the total carboxyl equivalents needed for reaction with the 100% level of the hydroxyl equivalents furnished by the polyhydric alcohol component. The reaction involved here is the formation of a mixture of the half-acid esters of the carbocyclic and acyclic dicarboxylic acids with the fatty acid partial ester of the polyhydric alcohol component. Again using pentaerythritol as the example, the product at this stage will contain from two to one unreacted hydroxyls.

The next step in the process involves adding to the half-acid ester product reaction mixture from the preceding step, at a temperature between about 125° and about 160° C. a solution of an organic peroxide in at least one vinyl monomer selected from the group consisting of alkyl acrylates and alkyl methacrylates wherein the alkyl group contains 1 to 4 carbon atoms, the peroxide being characterized by a half-life of between about 7.0 hours and about 0.06 hour at temperatures in the range of about 125° to about 160° C. and by being nonvolatile at temperatures in said range, the amount of vinyl monomer being from about 10 to about 50% by weight based on the solids content of the reaction mixture from the preceding step, and the amount of peroxide being from about 1 to about 10% by weight based on the amount of vinyl monomer. In this step of the process, monomer units are incorporated into the ester molecule by copolymerization at the reactive sites furnished by the double bond of the acyclic dicarboxylic acid anhydride utilized.

Finally, the monomer-treated reaction mixture is heated at a temperature between about 200° and about 300° C. until the acid number of the alkyd resin product has been reduced to less than 15. This step of the process involves esterification and provides a polyester product which is characterized by a high degree of linearity.

By virtue of the selection of amounts of reactants and reaction conditions, as described above, it is possible to produce a product with an acid number less than 15, with about 20 to about 50% excess hydroxyl equivalents over the amount used in esterifying the total number of carboxyl equivalents charged to the reaction, this corresponding to about 1.3 to about 4.5% free hydroxyl content, and with about 10 to about 50% alkyl acrylate or methacrylate content.

The following examples further illustrate the resins and process of this invention. All parts are by weight.

Example 1

Four hundred seventy-five grams (2.05 equivalents) of coconut oil was heated to 240° C. under a blanket of carbon dioxide. To the heated oil there then were added 4.75 grams of lithium ricinoleate as alcoholysis catalyst and 99.5 grams (2.81 equivalents) of technical grade pentaerythritol. This grade of pentaerythritol was also used in all subsequent examples and was characterized by containing 48% hydroxyl, having less than 0.01% ash content and by having a combining value of 35.4 for each hydroxyl equivalent.

The reaction mixture was reheated to 240° C. and held at that temperature for 45 minutes for a methanol-dilution test value of 2/1. This test is a means of following the course of the alcoholysis reaction and is based on the fact that triglyceride oils are insoluble in anhydrous methyl alcohol, whereas the monoesters are soluble. The test is carried out by adding two volumes of anhydrous methanol to one volume of alcoholysis mixture, shaking well to mix, allowing the mixture to settle, and checking for a separated layer. If the mixture is completely miscible, one more volume of methanol is added and the observation repeated. The sample of alcoholysis mixture should give a clear one-phase solution on 2:1 dilution with methanol for a monoester, and may or may not give such a solution on 3:1 dilution. The mixture then was cooled to 160° C., at which point 118.4 grams (1.6 equivalents) of phthalic anhydride was added, followed by 19.6 grams (0.4 equivalent) of maleic anhydride.

Over a period of approximately one hour there next was added a solution of five grams of dicumyl peroxide in 240 grams of methyl methacrylate. Then added in about two-thirds of an hour was a solution of 11.9 grams of dicumyl peroxide in 160 grams of methyl methacrylate, the temperature being maintained at 150° C. Upon completing the addition of the monomer-peroxide blend, the reaction mixture was held at 150° C. for about one-half hour.

The monomer-treated reaction mixture then was heated to 230° C., with carbon dioxide sparge, in about three-quarters of an hour and held at that temperature until the solids acid number was less than 11. The unreacted methyl methacrylate next was stripped from the reaction mixture. The total amount of methyl methacrylate recovered showed that 92% of the monomer had reacted during the resin preparation. The alkyd resin product upon analysis was found to have an acid number of 10.1. A 60% solids solution of the resin in xylene had a Gardner-Holdt viscosity at 25° C. of R–S and a Gardner color (1933 Standards) of 6–7. A corresponding 50% solution had a viscosity of B and a color of 5–6. Wet films (4-mil) cast from these solutions and dried provided clear and glossy films.

Example 2

In this and the remaining examples, the general procedure set forth in Example 1 was followed, with some changes in reaction conditions and/or reactants and amounts thereof being used. In the present example there was used 475 grams (2.05 equivalents) of coconut oil, 4.75 grams of lithium ricinoleate, 99.5 grams (2.81 equivalents) of technical grade pentaerythritol, 103.6 grams (1.40 equivalents) of phthalic anhydride, 29.4 grams (0.60 equivalent) of maleic anhydride, a first portion of 4.8 grams of dicumyl peroxide in solution in 240 grams of methyl methacrylate and a second portion of 11.2 grams dicumyl peroxide in solution in 160 grams of methyl methacrylate.

The alcoholysis reaction was carried out at 240° C. for a methanol-dilution test value of 3/1, and subsequently the reaction mixture was cooled at 170° C., at which point the phthalic anhydride and the maleic anhydride were added. At this point in the reaction, the acid number was 65.2. The first portion of dicumyl perioxide dissolved in methyl methacrylate was added slowly over a period of about one hour, keeping the reaction temperature at 144–155° C. The second portion of the monomer-peroxide blend then was added slowly in about two-thirds of an hour, keeping the reaction temperature at 146–155° C. and the reaction mixture subsequently was held for 15 minutes at 150–160° C. At this point, the acid number was 44.

The monomer-treated reaction mixture then was heated to 230° C. in 40 minutes with carbon dioxide sparge, and the unreacted methyl methacrylate was allowed to act as azeotropic solvent. The reaction mixture was held at 230° C. for about 2 hours, at which point the acid number was 10. After stripping off unreacted methyl methacrylate, the alkyd resin product was found to have a solid acid number of 9.2. The product was dissolved in xylene to 60% solids content and this solution had a Gardner-Holdt viscosity at 25° C. of W–X and a Gardner color of 4–5.

Example 3

In this example the reactants were 328 grams (2.05 equivalents) of pelargonic acid, 172 grams (4.85 equivalents) of technical grade pentaerythritol, 74 grams (1.0 equivalent) of phthalic anhydride, 49 grams (1.0 equivalent) of maleic anhydride, a first portion of 5.0 grams of dicumyl peroxide dissolved in 240 grams of methyl methacrylate and a second portion of 11.9 grams of dicumyl peroxide dissolved in 160 grams of methyl methacrylate. Reaction of the pelargonic acid and the pentaerythritol was effected at 225° C. until the product had an acid number of 9. After cooling the reaction mixture, the phthalic and maleic anhydrides then were added at 160° C., and at a temperature of 150° C. the first portion of dicumyl peroxide dissolved in methyl methacrylate was slowly added, followed subsequently by the second portion of monomer-peroxide blend.

The monomer-treated reaction mixture was heated to 225° C. and held at that temperature until the solid acid number was less than 23. The unreacted methyl methacrylate next was stripped from the reaction mixture, and the total amount of monomer recovered showed that 95% of the monomer had reacted during the resin preparation.

The alkyd resin product upon alaysis was found to have a solid acid number of 21. A 60% solids solution of the resin in xylene had a Gardner-Holdt viscosity at 25° C. of Z3 and a Gardner color of 4. A corresponding 50% solution had a viscosity of T–U and a color of 3–4. Wet films (4-mil) cast from these solutions and dried provided clear and glossy films.

Example 4

The reactants utilized in this example were composed of 328 grams (2.05 equivalents) of pelargonic acid, 3.28 grams of lithium ricinoleate as esterification catalyst, 93 grams (2.63 equivalents) of technical grade pentaerythritol, 81.6 grams (2.63 equivalents) of glycerine (99% pure), 96.2 grams (1.30 equivalents) of phthalic anhydride, 34.3 grams (0.70 equivalent) of maleic anhydride, a first portion of 4.8 grams of dicumyl peroxide dissolved in 240 grams of methyl methacrylate and a second portion 11.2 grams of dicumyl peroxide dissolved in 160 grams of methyl methacrylate. The pelargonic acid was heated to 200° C. and to it then were added the lithium ricinoleate, the pentaerythritol and the glycerine, and the temperature of the reaction mixture then was elevated at 220° C., at which point it was held for about one and one-quarter hours until the solid acid number was 5. The reaction mixture then was cooled to 170° C., at which point the phthalic and maleic anhydrides were added. The two different solutions of dicumyl peroxide in methyl methacrylate were subsequently added slowly, maintaining the temperature in the range of 140–150° C. Upon completion of the monomer-peroxide addition, the reaction mixture was held at 150–160° C. for about 5 minutes.

The temperature next was elevated to 220° C. over a period of about one hour, carbon dioxide sparge being utilized, and the unreacted methyl methacrylate was permitted to act as azeotropic solvent. The temperature was maintained at 220° C. for another hour, the solid acid number at this point being less than 12. After the unreacted methyl methacrylate had been stripped off, analysis of the alkyd resin product showed that it had a solid acid number of 11.1. The resin was dissolved in xylene to 50% solids content, and the solution was filtered using diatomaceous silica filter aid. This solution of the resin in xylene had a Gardner-Holdt viscosity at 25° C. of K–L and a Gardner color of 4–5.

*Example 5*

In this example the reactants were 100 grams (0.625 equivalent) of pelargonic acid, 1.0 gram of lithium ricinoleate, 87.4 grams (2.468 equivalents) of technical grade pentaerythritol, 127.3 grams (1.72 equivalents) of phthalic anhydride, 38.2 grams (1.234 equivalents) of ethylene glycol, 13.7 grams (0.28 equivalent) of maleic anhydride, a first portion of 1.74 grams of dicumyl peroxide dissolved in a mixture of 43.5 grams of methyl methacrylate and 43.5 grams of butyl methacrylate, and a second portion of 4.06 grams of dicumyl peroxide dissolved in a mixture of 29.0 grams of methyl methacrylate and 29.0 grams of butyl methacrylate. The pelargonic acid was heated to 200° C., at which point the lithium ricinoleate and the pentaerythritol were added, and the reaction mixture then was reheated to 210° C. and held at that temperature for approximately one and one-half hours until the solid acid number was 7. The mixture then was cooled to 170° C., at which point the phthalic anhydride first was added, followed by the ethylene glycol and finally by the maleic anhydride. The first portion of monomer-peroxide blend then was slowly added over about one hour, keeping the reaction temperature at 150–158° C. The second portion was subsequently added over a period of about three-quarters an hour, keeping the reaction temperature at 150–153° C.

The monomer-treated reaction mixture was then heated to 220° C. in about two hours, utilizing a carbon dioxide sparge, and the unreacted monomer was permitted to act as the azeotropic solvent. After reaching 220° C., this temperature was maintained for about one and one-half hours, the solid acid number at this point being 12. After the unreacted monomers had been removed by stripping, analysis of the alkyd resin product showed that it had a solid acid number of 11. The product was dissolved to 50% solids content in xylene and filtered as in the preceding example. This solution had a Gardner-Holdt viscosity at 25° C. of M–N and a Gardner color of 2–3.

*Example 6*

The alkyd resin preparation described in Example 5 was duplicated exactly except to use 87.0 grams of butyl acrylate to replace the 43.5 grams of methyl methacrylate and the 43.5 grams of butyl methacrylate in the first portion of monomer-peroxide blend, and to use 58.0 grams of butyl acrylate to replace the 29.0 grams of methyl methacrylate and the 29.0 grams of butyl methacrylate in the second portion of monomer-peroxide blend. The resin product at a solid acid number of 25 provided a clear solution at 50% solids content in xylene.

The examples have shown the use of pentaerythritol as the sole polyhydric alcohol component of the alkyd resins, as well as mixtures of pentaerythritol with glycerol and with ethylene glycol. Also operable are mixtures of pentaerythritol, glycerol and ethylene glycol. The pentaerythritol used was a technical grade thereof, and such a material ordinarily will analyze for about 86–90% monopentaerythritol, about 47–49% hydroxyl content, less than 0.01% ash (as $Na_2SO_4$), and a minimum of 99.5% solids. Obviously, a more pure form of pentaerythritol may be used, for example, those containing over 95% monopentaerythritol content. In the preparation of the alkyd resins of this invention, it is desirable to obtain a product which has an excess of hydroxyl groups. This permits further reaction of the product with other resins in certain applications, for example, reaction of the product with a melamine-based resin for the preparation of baking enamels. The free hydroxyl content in the resin product should be in the range of about 1.3 to about 4.5%, this corresponding to about 20 to about 50% excess hydroxyl equivalents. This in turn means that the amount of polyhydric alcohol component charged to the reaction should correspond to from about 120 to about 150% of the hydroxyl equivalents theoretically required in the reaction of said component with both the monocarboxylic and dicarboxylic acids used in preparation of the alkyd resin. On this basis, the usual amount of polyhydric alcohol component will correspond to about 125 to about 140% of the hydroxyl equivalents theoretically required.

When other polyhydric alcohols, such as glycerol or ethylene glycol, are used in admixture with pentaerythritol, the pentaerythritol in such mixtures should contribute at least 50% of the total hydroxyl equivalents furnished to the reaction. This also will obtain in those instances where the glycerol may be furnished in the form of a fatty acid triglyceride. The reason for this is the fact that use of too much glycerol, for example, leads to a product having inferior durability characteristics in comparison to those prepared using pentaerythritol as all or a major portion of the polyhydric alcohol component.

The examples have shown the use of pelargonic acid and coconut oil as fatty acid components. In general, the saturated fatty acids used in accordance with this invention will contain from eight to eighteen carbon atoms, thus including caprylic, pelargonic, capric, lauric, myristic, palmitic, and stearic acids. The triglycerides which may be used in accordance with the invention will contain at least 80% of such saturated fatty acids. For example, the coconut oil used in two of the examples contains caprylic, capric, lauric, myristic, palmitic, and stearic acids in such amounts that they represent more than 80% of the total acid content of the oil. Similarly constituted oils may be used in place of the coconut oil specifically shown.

The amount of fatty acid component used is sufficient to furnish about 20 to about 50%, preferably about 25 to about 50%, of the total carboxyl equivalents needed for reaction with the amount of hydroxyl equivalents corresponding to the 100% level in the 120 to 150% hydroxyl equivalents range specified for the polyhydric alcohol component. In other words, where a 20% excess of hydroxyl equivalents is supplied to the reaction, the total number of carboxyl equivalents needed will be 83.3% (100÷120) of the total hydroxyl equivalents. For a 50% excess of hydroxyl equivalents, the corresponding total number of carboxyl equivalents needed will be 66.7% (100÷150). In any event, the fatty acid component will furnish about 20 to about 50% of the total carboxyl equivalents required.

The reaction of the fatty acid component with the polyhydric alcohol component is carried out at a temperature between about 190° and about 250° C., preferably between about 200° and about 240° C. It is advisable during this esterification reaction (or alcoholysis reaction, in case a triglyceride oil is used) to provide an inert atmosphere in the reaction vessel, using, for example, carbon dioxide. Such an atmosphere also is advantageously used in the other reactions involved in the alkyd resin preparation.

Subsequent to the above formation of the fatty acid partial ester of the polyhydric alcohol component, the reaction mixture containing the partial ester is cooled to a temperature less than about 170° C., preferably to a temperature between about 140° and about 170° C. Then, at a temperature between about 140° and about 170° C. reaction is effected between the partial ester and a mixture of dicarboxylic acid anhydrides, such as a mixture of phthalic anhydride and maleic anhydride, for the purpose of producing the half-acid esters of dicarboxylic acids with the fatty acid partial ester of the polyhydric alcohol component. The preferred temperature range for this reaction is from about 160° to about 170° C. Temperatures higher than 170° C., for example, 175°–200° C., can lead to esterification reactions involving water formation, and this is undesirable at this stage of the resin preparation, because water can interfere in the subsequent reaction involving the vinyl monomer.

With regard to the mixture of dicarboxylic acid anhydrides, the examples have shown combinations of phthalic anhydride and maleic anhydride. These are the preferred components. However, instead of phthalic anhydride, there may be used other carbocyclic dicarboxylic acid anhydrides, including tetrahydrophthalic anhydride, hexahydrophthalic anhydride, tetrachlorophthalic anhydride and chlorendic anhydride (the Diels-Alder adduct of hexachlorocyclopentadiene and maleic anhydride). Any of these anhydrides, including phthalic anhydride, may be used alone as the carbocyclic dicarboxylic acid anhydride component, or in mixtures with each other. Similarly, the acyclic dicarboxylic acid anhydride component may be other than maleic anhydride, including also citraconic anhydride, itaconic anhydride and mixtures of any of these. In the combination of carbocyclic and acyclic anhydrides, the mole ratio of carbocyclic anhydride to acyclic anhydride is in the range of about 6:1 to about 2:1, preferably from about 4:1 to about 2:1. The carbocyclic and acyclic anhydrides may be furnished to the reaction mixture either in admixture with each other or separately, and it makes no difference in the latter instance which particular anhydride is added first. The amount of the combination of anhydrides is sufficient to furnish about 50 to about 80%, preferably about 50 to about 75%, of the total carboxyl equivalents needed for reaction with the amount of hydroxyl equivalents corresponding to the 100% level in the 120 to 150% hydroxyl equivalents range specified for the polyhydric alcohol component. In other words, the anhydrides plus the fatty acid component will provide 100% carboxyl equivalents for the 100% level of hydroxyl equivalents from the polyhydric alcohol component.

Maleic anhydride or one of its functional equivalents, citraconic anhydride or itaconic anhydride, is an essential component in combination with phthalic anhydride or one of the other carbocyclic dicarboxylic acid anhydrides. It is required to furnish a site for reaction with the alkyl acrylate or alkyl methacrylate monomer later in the process. The importance of the unsaturated acyclic dicarboxylic anhydride is illustrated by the fact that when phthalic anhydride was used as the sole dibasic acid source, the resulting alkyd resin yielded a film with a very faint haze, whereas the use of maleic anhydride in combination with phthalic anhydride provided an alkyd resin which yielded clear products with clear, glossy films. It is additionally important that the combination of carbocyclic and acyclic anhydrides be reacted with the partial ester of the polyhydric alcohol component in such a manner that the half-acid esters are first formed prior to carrying out the reaction with the alkyl acrylate or alkyl methacrylate monomer. This is illustrated by the fact that an alkyd resin prepared by charging fatty acid, pentaerythritol, phthalic anhydride and maleic anhydride, followed immediately by addition of methyl methacrylate, gave a clear solution which became very hazy within 24 hours.

The next step in accordance with the invention involves the addition of a solution of an organic peroxide in a vinyl monomer which may be an alkyl acrylate or alkyl methacrylate or mixture thereof, the alkyl group in these monomers being one containing one to four carbon atoms. The examples have shown the use of methyl methacrylate, butyl acrylate, and a mixture of methyl methacrylate with butyl methacrylate. Also operable, however, are the ethyl and propyl methacrylates, as well as the methyl, ethyl and propyl acrylates. Any of these monomers may be used either alone or in admixture with each other. The amount of monomer will be from about 10 to about 50% by weight, preferably from about 25 to about 40% by weight based on the solids content of the reaction mixture to which the monomer is added.

It is important in accordance with this invention to use an organic peroxide which is characterized by having a half-life of between about 7.0 hours and about 0.06 hour at temperatures in the range of about 125° to about 160° C. and by being nonvolatile at temperatures in said range. The half-life of the peroxide is a measure of its rate of decomposition in a dilute solution in a solvent such as benzene at a given temperature, and the half-life values of a particular peroxide will vary depending upon the temperature. At temperatures in the range of about 140° to about 160° C., the useful peroxides will ordinarily have half-lives of about 5 to about 60 minutes, and half-lives of about 15 to about 30 minutes at the desired reaction temperature will usually be satisfactory for addition of the vinyl monomer in accordance with this invention.

Exemplary of the peroxides which may be used are dicumyl peroxide (bis($\alpha,\alpha$-dimethylbenzyl peroxide)), m - bis(t - butylperoxyisopropyl)benzene, p - bis(t - butylperoxyisopropyl)benzene, t-butylperoxy isopropylcarbonate and 2,5-dimethyl-2,5-di(t-butylperoxy)hexane. Various other peroxides and hydroperoxides were evaluated, but were not found to be satisfactory. Benzoyl peroxide and t-butyl perbenzoate, for example, decompose very quickly at temperatures considerably below those required in the polymerization reaction and thus are unsatisfactory. Cumene hydroperoxide ($\alpha,\alpha$-dimethylbenzyl hydroperoxide), on the other hand, decomposes too slowly at the desired polymerization reaction temperatures and thus is not satisfactory as the primary source of free radicals. However, during the terminal part of the polymerization reaction, it may be used to replace a part of the organic peroxide and act as a free radical source during the period when the monomer-treated reaction mixture is being heated up to the higher temperatures used in the final step of the resin preparation. Di-t-butyl peroxide is an excellent initiator at the desired reaction temperatures, but its low boiling point of 111° C. constitutes a disadvantage in that the peroxide is volatile at the polymerization temperatures and thus will exist in the vapor phase and will cause homopolymerization of the monomers in that phase, leading to loss of monomer and formation of undesired homopolymer. The amount of organic peroxide used in accordance with the invention is from about 1 to about 10% by weight based on the amount of vinyl monomer utilized. The preferable amount on this basis is from about 3 to about 8% by weight. The comparatively large amounts of peroxide used in accordance with this invention appear to provide relatively short chains of monomer units which, as they exist in the alkyd resin product, give the product better compatibility characteristics.

Addition of the organic peroxide and the vinyl monomer should be carried out at a polymerization reaction temperature between about 125° and about 160° C. The preferred temperature range is from about 140° to about 160° C. These temperature ranges are satisfactory for a high rate of reaction of the monomer with the half-acid esters of the fatty acid partial ester of the polyhydric alcohol component, and also are satisfactory from the standpoint of the volatility of the monomers used. Water should be substantially absent during addition of the monomer. The presence of water results in the formation of azeotropes which lower the reaction temperature, causing changes in the rate of peroxide decomposition and rate of the polymerization reaction.

A significant feature of the invention is the addition of the solution of organic peroxide in the vinyl monomer in two parts and in carrying out the addition slowly and continuously. Since a high concentration of the monomer at any one time encourages the formation of homopolymers, a slow, continuous addition of the monomer gives a comparatively low concentration thereof and reduces the tendency toward homopolymer formation. It also permits better control of the reaction and better utilization of the peroxide.

The two-step addition of the peroxide-monomer solution is based on the finding that the amount of peroxide needed initially is comparatively small, whereas a larger amount is required in the terminal part of the reaction when the rate of polymerization tends to decrease, and more peroxide is required to drive the reaction to completion. In accordance with this finding, it was further determined that in the first step of adding the peroxide-monomer solution, it was desirable to utilize a solution containing from about 45 to about 60% of the total monomer to be added and from about 20 to about 30% of the total peroxide to be added. In the second step the solution will contain from about 40 to about 55% of the total monomer and from about 70 to about 80% of the total peroxide. As indicated earlier, some of the peroxide in the second step may be replaced with cumene hydroperoxide. For example, about 10 to about 50% by weight of the peroxide used in the second step may be so replaced.

Upon completion of the polymerization reaction, the acid number of the product will be in the range of about 40 to about 60, and the next step is to complete the formation of the alkyd resin by heating the monomer-treated reaction product at a temperature between about 200° and about 300° C. A preferred temperature range is from about 220° to about 250° C. This heating step is continued until the acid number of the product has been reduced to less than 15, and preferably less than 10. This usually is accomplished in from about one to about three hours, and during the heating period the unreacted monomer acts as an azeotropic solvent. Upon completion of the resin formation, the unreacted monomer usually is removed by stripping, and the resin may subsequently be dissolved in a solvent such as xylene.

The alkyd resins of this invention are characterized by their excellent color, color stability, viscosity stability, and freedom from odor of retained unreacted monomer. They may contain up to about 50% of combined alkyl acrylate or alkyl methacrylate, and the process whereby the resins are prepared as very efficient in that from about 90 to about 95% of the monomer charged will be found incorporated into the resin. The resins are compatible with materials such as nitro-cellulose, poly(vinyl chloride), chlorinated rubber, urea-formaldehyde and melamine-formaldehyde products, and cellulose acetate butyrate. The resins are useful in corrosion-resistant coatings, in baked alkyd-amino enamels, for use on appliances and metal equipment, and in automobile finishes as thermosetting acrylics.

What I claim and desire to protect by Letters Patent is:

1. A process for preparing an improved nondrying alkyd resin which comprises:
  (1) heating, at a temperature between about 190° C. and about 250° C., a polyhydric alcohol component in an amount corresponding to from about 120 to about 150% of the hydroxyl equivalents theoretically required in the reaction of said component with both the mono- and dicarboxylic acids used in preparation of the alkyd resin, said polyhydric alcohol component being selected from the group consisting of pentaerythritol and mixtures of pentaerythritol with at least one compound selected from the group consisting of glycerol and ethylene glycol, the pentaerythritol in said mixtures contributing at least 50% of the total hydroxyl equivalents furnished to the reaction, with at least one fatty acid component selected from the group consisting of saturated fatty acids having 8 to 18 carbon atoms and triglycerides of fatty acids wherein at least 80% of the fatty acids are saturated fatty acids having 8 to 18 carbon atoms, the amount of said fatty acid component being sufficient to provide from about 20 to about 50% of the total carboxyl equivalents needed for reaction with the 100% level of the hydroxyl equivalents furnished by the polyhydric alcohol component;
  (2) subsequently cooling the reaction mixture from (1) to a temperature less than about 170° C. and then effecting reaction of said mixture at a temperature in the range from about 140° to about 170° C. with the combination of at least one carbocyclic dicarboxylic acid anhydride selected from the group consisting of phthalic anhydride, tetrahydrophthalic anhydride, hexahydrophthalic anhydride, tetrachlorophthalic anhydride and the Diels-Alder adduct of hexachlorocyclopentadiene and maleic anhydride, and at least one acyclic dicarboxylic acid anhydride selected from the group consisting of maleic anhydride, citraconic anhydride and itaconic anhydride, the mole ratio of said carbocyclic anhydride to said acyclic anhydride being in the range of about 6:1 to about 2:1, and the amount of said combination of anhydrides being sufficient to provide from about 50% to about 80% of the total carboxyl equivalents needed for reaction with the 100% level of the hydroxyl equivalents furnished by the polyhydric alcohol component;
  (3) adding to the reaction mixture from (2), at a temperature between about 125° and about 160° C., a solution of an organic peroxide in at least one vinyl monomer selected from the group consisting of alkyl acrylates and alkyl methacrylates wherein the alkyl group contains 1 to 4 carbon atoms, the peroxide being characterized by a half-life of between about 7.0 hours and about 0.06 hour at temperatures in the range of about 125° to about 160° C. and by being nonvolatile at temperatures in said range, the amount of vinyl monomer being from about 10 to about 50% by weight based on the solids content of reaction mixture (2), and the amount of peroxide being from about 1 to about 10% by weight based on the amount of vinyl monomer, said solution of organic peroxide in the vinyl monomer being added in two parts, the first part containing from about 45 to 60% of the total monomer and from about 20 to about 30% of the total peroxide, and the second part containing the remaining amounts of monomer and peroxide; and (4) heating the reaction mixture from (3) at a temperature between about 200° and about 300° C. until the acid number of the alkyd resin product has been reduced to less than 15.

2. The process of claim 1 wherein the polyhydric alcohol component is pentaerythritol.

3. The process of claim 1 wherein the polyhydric alcohol component is a mixture of pentaerythritol and glycerol.

4. The process of claim 1 wherein the polyhydric alcohol component is a mixture of pentaerythritol and ethylene glycol.

5. The process of claim 1 wherein the carbocyclic dicarboxylic acid anhydride is phthalic anhydride and the acyclic dicarboxylic acid hydride is maleic anhydride.

6. The process of claim 1 wherein the vinyl monomer is methyl methacrylate.

7. The process of claim 1 wherein the vinyl monomer is butyl methacrylate.

8. The process of claim 1 wherein the organic peroxide is dicumyl peroxide.

9. The improved nondrying alkyd resins prepared in accordance with the process of claim 1.

References Cited
UNITED STATES PATENTS

| | | | |
|---|---|---|---|
| 2,190,789 | 2/1940 | Hubbuch | 260—22 |
| 2,407,479 | 9/1946 | D'Alelio | 260—22 |
| 2,559,466 | 7/1951 | Root | 260—22 |
| 2,928,796 | 3/1960 | Heckles | 260—22 |
| 3,088,926 | 5/1963 | Morris et al. | 260—22 |

DONALD E. CZAJA, *Primary Examiner.*

R. W. GRIFFIN, *Assistant Examiner.*